United States Patent
Zhang et al.

(10) Patent No.: US 10,007,717 B2
(45) Date of Patent: Jun. 26, 2018

(54) CLUSTERING COMMUNICATIONS BASED ON CLASSIFICATION

(71) Applicant: Google Inc., Mountain View, CA (US)

(72) Inventors: Xincheng Zhang, Stanford, CA (US); Hui Tan, Palo Alto, CA (US); Zhiyu Wang, Beijing (CN); Jinan Lou, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 70 days.

(21) Appl. No.: 14/414,855

(22) PCT Filed: Sep. 18, 2014

(86) PCT No.: PCT/CN2014/086875
§ 371 (c)(1),
(2) Date: Jan. 14, 2015

(87) PCT Pub. No.: WO2016/041181
PCT Pub. Date: Mar. 24, 2016

(65) Prior Publication Data
US 2016/0314182 A1   Oct. 27, 2016

(51) Int. Cl.
*G06F 17/30* (2006.01)
*H04L 12/26* (2006.01)

(52) U.S. Cl.
CPC .. *G06F 17/30598* (2013.01); *G06F 17/30705* (2013.01); *H04L 43/04* (2013.01)

(58) Field of Classification Search
CPC ......... G06F 17/30598; G06F 17/30705; G06F 17/30707; G06F 17/3071; G06F 17/30713; H04L 43/04
See application file for complete search history.

(56) References Cited

U.S. PATENT DOCUMENTS 5,819,258 A * 10/1998 Vaithyanathan .... G06F 17/3071
                                                                 707/692
6,055,540 A * 4/2000 Snow .................. G06F 17/3061
(Continued)

FOREIGN PATENT DOCUMENTS

CN    1324046    11/2001
CN    1877523    12/2006

OTHER PUBLICATIONS

International Search Report and Written Opinion of PCT Ser. No. PCT/CN14/086875 dated Jun. 12, 2015.
(Continued)

*Primary Examiner* — James Trujillo
*Assistant Examiner* — Hubert Cheung
(74) *Attorney, Agent, or Firm* — Middleton Reutlinger

(57) ABSTRACT

Methods and apparatus related to clustering documents based on one or more classification terms and optionally based on similarity of structural paths of the documents. In some implementations, the documents are communications such as structured emails or other structured communications. In some of those implementations, clustering the communications includes identifying a plurality of classification terms indicative of a classification, identifying a corpus of communications that includes communications that are not labeled with an association to the classification, and determining a cluster of the communications based on occurrence of one or more of the classification terms in the communications of the cluster.

25 Claims, 4 Drawing Sheets

(56) References Cited

U.S. PATENT DOCUMENTS

| | | | | |
|---|---|---|---|---|
| 6,728,752 | B1* | 4/2004 | Chen | G06F 17/3025 707/999.01 |
| 6,751,621 | B1* | 6/2004 | Calistri-Yeh | G06F 17/30731 |
| 7,024,400 | B2* | 4/2006 | Tokuda | G06F 17/271 706/20 |
| 2002/0065845 | A1* | 5/2002 | Naito | G06F 17/30634 715/248 |
| 2002/0120619 | A1* | 8/2002 | Marso | G06Q 30/02 |
| 2005/0060287 | A1* | 3/2005 | Hellman | G06F 17/30705 |
| 2005/0228790 | A1* | 10/2005 | Ronnewinkel | G06Q 10/107 |
| 2006/0288275 | A1 | 12/2006 | Chidlovskii et al. | |
| 2008/0250503 | A1* | 10/2008 | Bandini | G06Q 10/107 726/23 |
| 2008/0281814 | A1* | 11/2008 | Calistri-Yeh | G06F 17/30731 |
| 2009/0006391 | A1* | 1/2009 | Ram | G06F 17/30705 |
| 2010/0306147 | A1* | 12/2010 | Platt | G06F 17/30705 706/46 |
| 2010/0332428 | A1* | 12/2010 | McHenry | G06F 17/3071 706/12 |
| 2011/0161429 | A1* | 6/2011 | Marcus | G06Q 10/107 709/206 |
| 2013/0013603 | A1* | 1/2013 | Parker | G06F 17/3071 707/737 |
| 2013/0268535 | A1* | 10/2013 | Inaba | G06F 3/048 707/740 |
| 2014/0115495 | A1* | 4/2014 | Wetherell | G06F 17/30705 715/752 |
| 2014/0188830 | A1* | 7/2014 | deVille | G06F 17/3071 707/706 |
| 2015/0149461 | A1* | 5/2015 | Aguilar Lemarroy | G06F 17/30705 707/737 |
| 2015/0186494 | A1* | 7/2015 | Gilad | H04L 51/22 707/740 |
| 2016/0306812 | A1* | 10/2016 | McHenry | G06F 17/30 |

OTHER PUBLICATIONS

Raskutti, et al. "Combining Clustering and Co-Training to Enhance Text Classification Using Unlabelled Data" International Conference on Knowledge Discover and Data Mining. Edmonton, Alberta, Canada. Jul. 23, 2002.

Kyriakopoulou, et al. "Text Classification Using Clustering" Proceedings of the ECML-PKDD Discovery Challenge Workshop. Sep. 22, 2006.

Nigam, et al. "Text Classification from Labeled and Unlabeled Documents using EM" Machine Learn, Kluwer Academic Publishers. vol. 39. Jan. 1, 2000.

European Patent Office; Extended European Search Report issued in Appl. No. 14901880.6 dated Feb. 8, 2018.

\* cited by examiner

CLUSTERING COMMUNICATIONS BASED ON CLASSIFICATION

BACKGROUND

Computer-based approaches have been utilized to assign a classification to one or more documents such as emails or other communications. Generally, a classification of a document indicates a category or "vertical" associated with content of the document. Some approaches utilize a classifier that has been trained utilizing supervised learning techniques. Such supervised learning techniques rely on a training set of labeled documents that have been labeled as being associated with the classification. In some situations it may be impractical or impossible to obtain a large enough quantity of labeled documents for desired supervised training of a classifier. For example, privacy considerations may prevent many emails and other private documents from being provided for human review and labeling.

SUMMARY

This specification is directed generally to methods and apparatus related to clustering documents based on one or more classification terms and optionally based on similarity of structural paths of the documents. Some implementations are directed generally toward clustering communications such as, for example, business-to-consumer ("B2C") emails and similar communications. Some of those implementations enable clustering of the communications without human intervention and/or without human knowledge of the contents of the communications.

In some implementations, clustering communications includes identifying a plurality of classification terms indicative of a classification, identifying a corpus of communications that includes communications that are not labeled with an association to the classification, and determining a cluster of the communications based on occurrence of one or more of the classification terms in the communications of the cluster. For example, classification terms indicative of a "flight" classification may be identified such as "flight", "departure", "arrival", etc. A cluster of structured communications indicative of the "flight" classification may be determined based at least in part on those structured communications including one or more of the classification terms. As described, one or more of the structured communications of the determined cluster may include those that have not been previously labeled with an association to the classification. In some implementations, the cluster may further be determined based on structural paths of the structured communications, such that structured communications that include the same and/or similar structural paths may be included in the cluster.

A determined cluster of communications may be utilized for various purposes. For example, a data extraction template may be generated based on analysis of the communications of the cluster to enable extraction of data from future communications that are similar to the communications of the cluster. Also, for example, features associated with the communications of the cluster may be determined and assigned to an indication of the classification to enable other communications that include those features to be associated with the indication of the classification. For instance, future communications having one or more of the features may be automatically assigned a label that corresponds to the classification. Also, for instance, a data extraction parser that corresponds to the classification (to extract desired data from the communications) may be selected for future communications having one or more of the features.

In some implementations, a computer implemented method may be provided that includes the steps of: identifying a plurality of classification terms indicative of a classification; identifying a corpus of communications from one or more databases, the corpus of communications including a plurality of communications that are not labeled with an association to the classification; determining a cluster of the communications based on occurrence of one or more of the classification terms in the communications of the cluster; determining a feature set based on the communications of the cluster, the feature set including one or more features that are based on content of the communications that is in addition to the classification terms; and assigning the feature set to an indication of the classification.

This method and other implementations of technology disclosed herein may each optionally include one or more of the following features.

In some implementations, the communications of the cluster include structured communications, and determining the cluster of the communications is further based on structural paths of the structured communications of the cluster. In some of those implementations, determining the feature set comprises determining structural features of the features based on the structural paths of the structured communications of the cluster. In some versions of those implementations, determining the feature set comprises: determining term features of the features based on communication terms of the structured communications of the cluster, wherein one or more of the communication terms on which the term features are determined are in addition to the classification terms.

In some implementations, determining the feature set comprises: determining term features of the features based on communication terms of the communications of the cluster; wherein one or more of the communication terms on which the term features are determined are in addition to the classification terms.

In some implementations, the communications of the cluster include structured communications, and determining the feature set comprises: determining term features of the features based on communication terms of the structured communications of the cluster and structural paths of the structured communications of the cluster. In some versions of those implementations, each of the term features is indicative of a term of the communication terms and one or more of the structural paths in which the term appears in the structured communications of the given cluster.

In some implementations, the communications of the cluster are from a plurality of sending entities.

In some implementations, identifying the classification terms indicative of the classification comprises: identifying one or more labeled communications having labels indicating the classification; and determining one or more of the classification terms based on the labeled communications. In some of those implementations, the labels indicating the classification are based on names of folders with which the labeled communications are associated and/or are based on annotations of the labeled communications by users that received the labeled communications. In some implementations, determining the one or more of the classification terms based on the labeled communications comprises: selecting a term of the classification terms based on comparison of a frequency of occurrence of the term in the labeled communications to a frequency of occurrence of the term in a larger corpus of documents.

In some implementations, the communications are emails.

In some implementations, the method further includes: identifying an additional communication; and determining the additional communication is associated with the indication of the classification based on comparing the feature set to content of the additional communication.

In some implementations, the indication of the classification is a data extraction parser for that classification. In some of those implementations, the data extraction parser is configured based on the communications of the given cluster.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
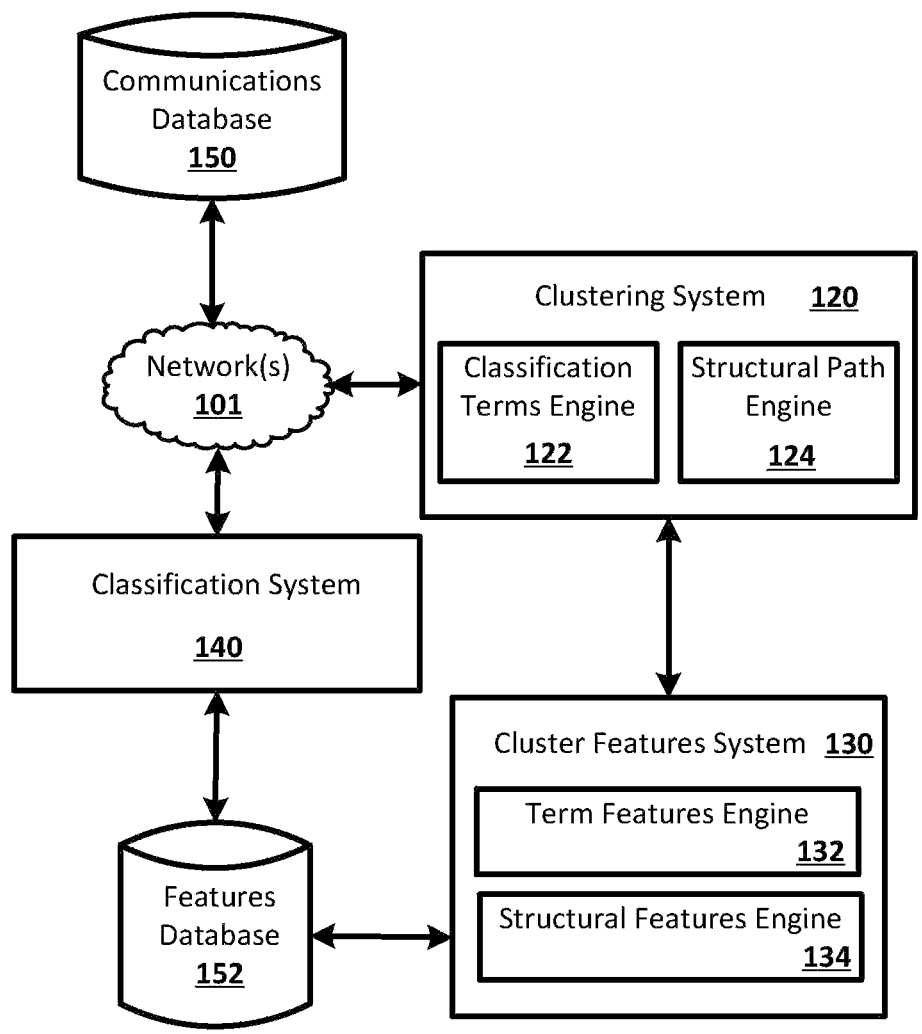
FIG. 1 illustrates an example environment in which a cluster of documents may be determined, a feature set may be determined based on the cluster, and/or an indication of a classification for additional documents may be determined based on the feature set.

FIG. 1 illustrates an example environment in which a cluster of documents may be determined, a feature set may be determined based on the cluster, and/or an indication of a classification for additional documents may be determined based on the feature set. The example environment includes a clustering system 120, a cluster features system 130, and a classification system 140. Clustering system 120, cluster features system 130, and classification system 140 may each be implemented in one or more computers that communicate, for example, through a network. Clustering system 120, cluster features system 130, and classification system 140 are example systems in which the systems, components, and techniques described herein may be implemented and/or with which systems, components, and techniques described herein may interface.

Systems 120, 130, and 140 may each include one or more memories for storage of data and software applications, one or more processors for accessing data and executing applications, and other components that facilitate communication over a network. The operations performed by systems 120, 130, and 140 may be distributed across multiple computer systems. In some implementations, all or aspects of systems 120, 130, and 140 may be omitted and/or combined. For example, in some implementations clustering system 120 and cluster features system 130 may be combined.

The example environment also includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques.

Generally, clustering system 120 identifies classification terms associated with a particular classification and determines a cluster of documents based at least in part on occurrence of one or more of the classification terms in the documents of the cluster. The clustering system 120 provides an indication of the cluster and the classification to the cluster features system 130. The cluster features system 130 determines a feature set of one or more features based at least in part on content of the documents of the cluster—and assigns the feature set to an indication of the classification. The classification system 140 compares the determined feature set to content of additional documents to determine other documents that are associated with the indication of the classification. Additional description of each of systems 120, 130, and 140 is provided below.

Generally, as used herein a "classification" associated with a document indicates a category or "vertical" of content of the document. Examples of classifications of communications documents include those indicative of a "flight" (e.g., pertaining to flight reservations, flight reminders), a "hotel" (e.g., pertaining to hotel reservations), an "event" (e.g., pertaining to a movie, party, concert, or other event), a "receipt" (e.g., pertaining to a receipt for a purchased item), a "bill" (e.g., pertaining to a bill that needs to be paid), etc. Additional and/or alternative classifications may be utilized and a document may optionally be associated with multiple classifications. For example, an email that is a purchase receipt for concert tickets may have both a "receipt" classification and an "event" classification. Also, classifications may be defined with any desired level of granularity. For example, classifications may include "flights", "car rentals", "trains", and/or "transportation" (which may encompass "flights", "car rentals", and "trains").

As used herein, a "structured document" may refer to a document that is structured using one or more structured markup languages such as the eXtensible Markup Language ("XML") or the Hypertext Markup Language ("HTML"). As used herein, a "structured communication" is a structured document that is a communication document such as an email, a text message (e.g., SMS, MMS), an instant messenger message, or any other structured communication, particularly Business-to-consumer ("B2C") communications. Communications database 150 may include a corpus of communications, such as communications that include structured communications. For example, in some implementations communications database 150 may include one or more storage mediums that store email communications of multiple users. In some of those implementations, an email service may optionally maintain communications database 150. In some implementations, communications of communications database 150 may include one or more storage mediums that store text message or other communications sent and/or received via mobile or other computing devices of multiple users.

A "structural path" may refer to an address (e.g., through markup language constructs) to reach a node in a structured document. For example, an address to reach each node in an email HTML node tree is one type of structural path. An XPath is another example. "Structural paths" may exist for various types of markup languages, including but not limited to, HTML and XML.

As described above, clustering system 120 clusters documents based at least in part on classification terms. In various implementations, clustering system 120 may include a classification terms engine 122 and a structural path engine 124. In some implementations, all or aspects of engine 122 and/or engine 124 may be omitted. In some implementations, all or aspects of engine 122 and/or engine 124 may be combined. In some implementations, all or aspects of engine 122 and/or engine 124 may be implemented in a component that is separate from clustering system 120.

Generally, classification terms engine 122 identifies a plurality of classification terms that are indicative of a particular classification. For example, classification terms indicative of a "flight" classification may include "flight", "departure", "arrival", etc. As another example, classification terms indicative of a "bill" classification may include "due date", "amount", etc. The plurality of classification terms indicative of a classification may include user supplied terms and/or terms identified from communications that have been associated with the classification. In this specification "term" may be utilized to refer to only a single term (e.g., "departure") and/or to multiple terms (e.g., "departure date"), depending on the context. For example, some classification terms may include only a single term, while other classification terms may include two or more terms.

In some implementations of identifying classification terms of a classification, the classification terms engine 122 identifies labeled communications from communications database 150 that each have labels indicating the classification and determines one or more of the classification terms based on the identified labeled communications. In some of those implementations, one or more of the labels may be based on the names of folders with which the labeled communications have been associated. For example, a label of a given email received by a user may be based on the name of an inbox subfolder in which the user stored the given email. For instance, the label may be "receipt" based on the user storing the given email in a "receipts" subfolder. As another example, the label may be "transportation" based on the user storing the given email in a "flights" subfolder (e.g., based on an "is-a" or other relationship between the label "transportation" and the term "flights").

In some implementations, one or more of the labels may be based on annotations of the labeled communications by users that received the labeled communications. For example, an email client may offer users the option to annotate emails with one or more labels such as user defined labels (e.g., typed or otherwise inputted by the user), and/or labels from a defined set of labels (e.g., a defined set that includes "receipts", "travel", "personal"). For example, the label may be "receipt" based on the user annotating the email as a "receipt" email. As another example, the label may be "bills" based on the user annotating the email as a "cable bill" email. In some implementations, users that receive communications may provide permission to one or more other individuals to have the other individuals manually review the communications and assign one or more labels to the communications. In some of those implementations, one or more of the labels may be based on labels assigned by the other individuals.

The classification terms engine 122 may utilize various techniques to select classification terms indicative of a classification from identified labeled communications that have labels indicating the classification. For example, the classification engine 122 may select a classification term from the labeled communications based on one or more factors such as a term frequency-inverse document frequency (TFIDF) measure of the term in the labeled communications, formatting(s) of the term in one or more of the labeled communications (e.g., underlining, bolding, font size, and/or other formatting of the term), position(s) of the term in the labeled communications (e.g., where the term appears in the communication, where the term appears in a section of the communication), etc. As one example, a first term that has a TFIDF measure that indicates relatively frequent occurrence of the term in emails having labels indicating the classification as compared to its frequency of occurrence in a larger corpus (e.g., all emails) may be more likely to be selected as a classification term than a second term that has a TFIDF measure that indicates relatively infrequent occurrence of the term in emails having labels indicating the classification. As another example, a term may be discretely selected as a classification term if it: appears in at least a threshold number of the emails having labels indicating the classification; frequently appears at the beginning of paragraphs or other sections of the emails having labels indicating the classification; and/or is frequently provided with formatting that is unique from formatting of surrounding terms in the emails.

As yet another example, a weight may be determined for a term based on one or more factors related to occurrence of the term in emails having labels indicating the classification, and the weight may be compared to a threshold to determine whether to select the term. In some of those implementations, automatic thresholding techniques may be utilized to determine which terms are selected for a classification based on weights associated with those terms. In some of those implementations, the one or more factors on which the weight of a term may be based may include, for example: a TFIDF measure for the term in emails having labels indicating the classification; a quantity of the emails (having labels indicating the classification) in which the term occurs; a quantity of occurrences the term in emails having labels indicating the classification; a quantity of occurrences of the term at the beginning of paragraphs or other sections of the emails having labels indicating the classification; and/or formatting of the term in emails having labels indicating the classification.

The clustering system 120 determines a cluster of documents based at least in part on occurrence of one or more of the identified classification terms in the documents of the cluster. For example, the clustering system 120 may determine a cluster of emails from communications database 150. The emails of the determined cluster may include emails that have not been labeled with an association to the classification (e.g., they may include those that have not been placed in a folder indicative of the classification or otherwise labeled with the classification). The emails of the determined cluster may also include emails that have been previously labeled with an association to the classification.

In some implementations, determining occurrence of one or more of the classification terms in the documents of the cluster includes matching of one or more of the classification terms to one or more terms in each of the communications of the cluster. The clustering system 120 may employ exact matching and/or soft matching. Examples of soft matching include determining a candidate term matches a classification term based on the candidate term being a synonym of the classification term, the candidate term and the classification term having canonical forms that are identical, and/or based on other similarity measures between the terms. Terms that match in the communications may be terms from the subject and/or body of the communications. As one example, a cluster of structured communications indicative of a "flight" classification may be determined that includes structured communications that each include the classification terms "flight", "departure", and "arrival" in the body of the communication.

In some implementations, the documents analyzed by clustering system 120 include, or are restricted to, structured documents. In some of those implementations, the clustering system 120 determines the cluster of documents further based on the structural paths of the structured documents, such that structured documents that include the same and/or similar structural paths are included in the cluster. For example, the documents may be structured emails and the cluster may be determined such that only emails having the same and/or similar structural paths are included in the cluster. In some implementations, the clustering system 120 determines an initial cluster based on the occurrence of one or more of the classification terms in the documents of the cluster. The clustering system 120 then determines one or more clusters, that are each a subset of the initial cluster, by clustering the documents of the initial cluster based on the structural paths of those documents. In some implementations, the clustering system 120 determines one or more clusters of documents while simultaneously considering the classification terms of the documents and the structural paths of the documents.

Generally, structural path engine 124 identifies one or more features of structural paths of structured documents for use by clustering system 120 in clustering the documents based on the structural paths. For example, structural path engine 124 may generate structural path feature vectors for a plurality of structured communications. Each structural path feature vector may indicate one or more properties of the structural paths of a corresponding structured communication. Properties of structural paths may include, for example, properties indicative of the hierarchical structure of the structural paths, the node types of one or more nodes of the structural paths, the values of one or more nodes of the structural paths, etc. The clustering system 120 may determine structured communications to include in a given cluster based on similarity between the structural path feature vectors of the structured communications. Exact matching and/or soft matching of the structural path feature vectors or other representations of the structural paths may be utilized.

In some implementations, clusters of communications determined by clustering engine 120 according to techniques described herein may include clusters that are not restricted to communications that are from the same sending entity and/or that contain the same or similar "subjects". In other words, a determined cluster may include communications from a plurality of sending entities and/or communications with disparate "subjects". For example, emails from Company A (e.g., from confirmation@companyaemail.com) and emails from Company B (e.g., from flights@companyb.com) may both be included in a cluster. For instance, where the cluster is determined based on classification terms and structural paths, the emails from Company A and Company B that are included in the cluster may share one or more of the same classification terms and share the same and/or similar structural paths. Also, for example, a first email with a subject of "Flight Confirmation" and a second email with a subject of "Your Reservations" may both be included in a cluster.

Each cluster determined by clustering system 120 includes documents that generally correspond to a particular classification and that optionally generally include the same or similar structural paths. The parameters utilized by the clustering system 120 may be set to achieve a desired degree of conformity between the documents of clusters. For example, the quantity and/or percentage of classification terms that must occur in a given document to include the document in a given cluster may be set to achieve a desired degree of conformity of the documents to a classification corresponding to the classification terms. Also, for example, a similarity measure between structural paths of documents may be set to achieve a desired degree of conformity between the structural paths of documents of a given cluster. In some implementations, the clustering system 120 may utilize the same parameters for all classifications and/or all iterations. In some implementations, the parameters may be different for one or more classification and/or iterations.

In some implementations, the clustering system 120 may optionally utilize one or more clustering algorithms in clustering the documents into one or more clusters. For example, k-means clustering may be utilized in determining a cluster based on classification terms, with the "k" set to two. Generally, k-means clustering aims to partition observations into a plurality of groups, with each observation being included in a group with which it is most related (e.g., based on occurrence or non-occurrence of classification terms). Also, for example, in some implementations x-means clustering may be utilized in determining a cluster based on structural paths. Generally, x-means clustering is an unsupervised method of finding the ideal k to use for k-means clustering. Additional and/or alternative clustering techniques may optionally be used.

As described above, cluster features system 130 determines a feature set of one or more features based at least in part on documents of a cluster determined by the clustering system 120. The cluster features system 130 further assigns the feature set to an indication of the classification with which the classification terms (utilized by the clustering system 120 in determining the cluster) are associated. For example, the feature set may be assigned to the indication of the classification and the feature set and an association to the indication may be stored in features database 152.

In some implementations, a determined feature set may be assigned to an indication of the classification to enable other communications that include features that are the same and/or similar to features of the feature set to be associated with the indication of the classification. For example, the indication of the classification may be an identifier of the classification and future communications that have at least a threshold level of similarity with a feature set assigned to the indication of the classification may be automatically assigned the identifier of the classification. For instance, a feature vector of a future communication may be determined that includes structural and/or term features of that future communication and compared to a feature vector assigned to a classification to determine if the future communication has at least a threshold level of similarity to the feature vector assigned to the classification. Also, for example, the indication of the classification may be an identifier of a data extraction parser that corresponds to the classification and future communications that have at least a threshold level of similarity with a feature set assigned to the indication of classification may be parsed with the data extraction parser that corresponds to the classification. For instance, a "flight" data extraction parser (e.g., configured to extract departure date/time, departure airport, arrival date/time, etc.) may be selected for parsing an email based on determining the email is associated with a "flight" classification.

As described in more detail below, in some implementations one or more features of the feature set are based on content of the structured documents of the cluster that is in addition to the classification terms utilized to determine the cluster. For instance, for a "flight" classification, a term feature of the feature set may be based on the term "passenger" (that was not a "classification term") based on that term appearing relatively frequently in the communications of the cluster as compared to an overall popularity of the term. Also, for instance, for a "flight" classification, a structural feature of the feature set may be based on structural paths of one or more of the documents of the cluster.

In various implementations, cluster features system 130 may include a term features engine 132 and a structural features engine 134. In some implementations, all or aspects of engine 132 and/or engine 134 may be omitted. In some implementations, all or aspects of engine 132 and/or engine 134 may be combined. In some implementations, all or aspects of engine 132 and/or engine 134 may be implemented in a component that is separate from cluster features system 130.

Generally, the term features engine 132 determines one or more term features of a feature set based at least in part on terms that are included in documents of a cluster determined by the clustering system 120. For example, the term features may include features related to one or more terms selected based on TFIDF measures of the terms for the cluster, formatting(s) of the terms in one or more of the documents of the cluster (e.g., underlining, bolding, font size, and/or other formatting of the terms), position(s) of the terms in the documents of the cluster (e.g., where the terms appear in the communications, where the terms appear in a segment of the communications), etc. As one example, a first term that has a TFIDF measure that indicates relatively frequent occurrence of the term in emails of a cluster of emails as compared to its frequency of occurrence in a larger corpus (e.g., all emails) may be more likely to be selected as a term on which a term feature is based than a second term that has a TFIDF measure that indicates relatively infrequent occurrence of the term in the cluster.

In some implementations, one or more terms on which term features are based may additionally or alternatively be selected based at least in part on human or other labeling of terms for a given classification that indicates the importance of the term for the classification. For example, certain terms may be labeled as important for a classification and, based on such labeling, may be more likely to be selected as a term on which term features are based than terms not labeled as important for the classification. In some of those implementations, one or more terms on which term features are based may be selected based at least in part on labeling that indicates the importance of the term for the classification, and based at least in part on one or more factors related to occurrence of the terms in the documents of the cluster.

In some implementations, the term features engine 132 may determine weights for terms based on one or more of the aforementioned factors, and utilize the determined weights to select one or more terms on which term features are based. For example, the terms with the top X weights may be selected and/or the terms having weights satisfying a threshold may be selected. In some of those implementations, the one or more factors on which the weight of a term is based may include, for example: human labeling or other labeling of terms for a given classification that indicates the importance of the term for the classification; a TFIDF measure for the term in documents of the cluster; a quantity of the documents of the cluster in which the term occurs; a quantity of occurrences of the term in documents of the cluster; a quantity of occurrences of the term at the beginning of paragraphs or other sections of the documents of the cluster; and/or formatting of the term in documents of the cluster.

The terms on which term features are based may include one or more of the classification terms utilized to determine the set of structured communications and/or additional terms. In some implementations, the term features may optionally include indications of one or more of the structural paths where the terms occur in one or more of the communications of the cluster. For instance, if "passenger" only occurred in a particular XPath of communications of a cluster, a term feature of "passenger" may include an indication of that term and an indication of the particular XPath. Also, for instance, if "passenger" occurred in a first XPath of communications of a cluster at a first rate and occurred in a second XPath of communications of the cluster at a second rate, a term feature of "passenger" may include an indication of that term and an indication of the particular occurrence rates in each of the XPaths (along with indications of those XPaths).

In some implementations, a term feature of a feature set may be associated with a weight indicating the strength of the association of the term feature to the feature set. For example, for the immediately preceding "passenger" example, a term feature associated with "passenger" for the first XPath may be assigned a first weight that reflects the first rate and a term feature associated with "passenger" for the second XPath may be assigned a second weight that reflects the second rate. Also, for example, a first term may have a TFIDF measure that indicates relatively frequent occurrence of the term in emails of a cluster of emails and a second term may have a TFIDF measure that indicates relatively infrequent occurrence of the term in emails of the cluster. Based at least on the disparate TFIDF measures, a first term feature based on the first term may be assigned a first weight that indicates a greater strength of association to the feature set than a second weight assigned to a second term feature based on the second term.

Generally, the structural features engine 134 determines one or more structural features of a feature set based on structural paths of documents of a cluster determined by the clustering system 120. Each structural feature may indicate one or more properties of the structural paths of documents of a given cluster. Properties of structural paths may include, for example, properties indicative of the hierarchical structure of the structural paths, the node types of one or more nodes of the structural paths, the values of one or more nodes of the structural paths, etc. As one example, the cluster may include structured XML emails and the structural features may indicate one or more signature XPaths based on frequency of occurrence of the XPaths in the structured XML emails of the cluster.

In some implementations, a structural feature of a feature set may be associated with a weight indicating the strength of the association of the structural feature to the feature set. For example, a first structural feature may indicate a property of structural paths of documents of a cluster that occurs in 80% of the documents of the cluster, whereas a second structural feature may indicate a property of structural paths of documents of the cluster that occurs in 50% of the documents of the cluster. Based at least on the disparate rates of occurrence, the first structural feature may be assigned a first weight that indicates a greater strength of association to the feature set than a second weight assigned to the second structural features.

In some implementations, one or more structural paths on which structural features are based may additionally or alternatively be selected based at least in part on human or other labeling of structural paths that indicates the importance of the structural path. For example, certain structural paths may be labeled as important overall and/or for a given classification and, based on such labeling, may be more likely to be selected as a structural path on which structural features are based than structural paths not labeled as important. In some of those implementations, one or more structural paths on which structural features are based may be selected based at least in part on labeling that indicates the importance of the structural path, and based at least in part on one or more factors related to occurrence of the structural paths in the documents of the cluster.

Figure 2:
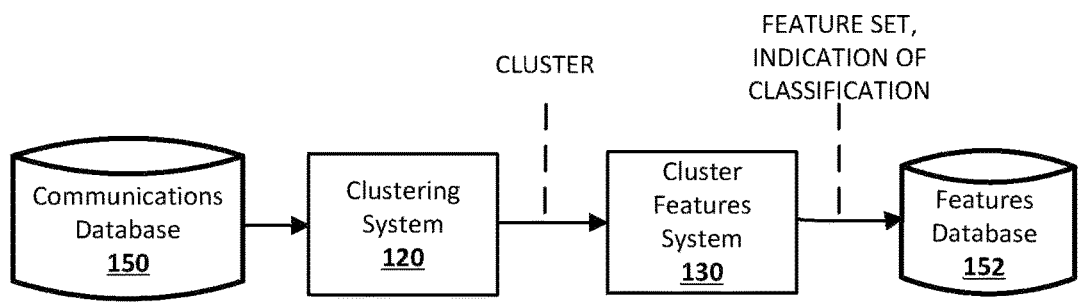
FIG. 2 illustrates an example of how a cluster of communications may be determined and a feature set may be determined based on the cluster.

FIG. 2 illustrates an example of how a cluster of communications may be determined and a feature set may be determined based on the cluster. Clustering system 120 identifies classification terms associated with a particular classification and determines a cluster of communications from communications of communications database 150. For example, the classification may be "receipts" and the classification terms may include terms such as "purchase", "total", "payment", and "date". In some implementations, the clustering system 120 may determine the classification terms based on analysis of communications from communications database 150 that are labeled with the classification.

The clustering system 120 determines the cluster based on occurrence of one or more of the classification terms in the documents of the cluster and/or based on structural paths of the structured communications of the cluster. As one example, and continuing with the previous example, the clustering system 120 may determine the cluster based on occurrence of a set of one or more of: "purchase", "total", "payment", and "date" in the communications of the cluster and/or based on similarity between the structural paths of the communications of the cluster. As described herein, the cluster determined by clustering system 120 may include one or more communications from communications database 150 that have not been previously labeled with an indication of the classification. As also described herein, the determined cluster may include communications from a plurality of sending entities and/or communications with disparate "subjects".

The clustering system 120 provides an indication of the cluster and the classification to the cluster features system 130. The cluster feature system 130 determines a feature set of one or more features based on content of the documents of the cluster—and assigns the feature set to an indication of the classification. The cluster feature system 130 stores the feature set and an association to the indication in features database 152 for use by one or more additional components such as classification system 140. The feature set includes one or more features that are based on content of the communications of the cluster and that are in addition to the classification terms utilized by the clustering system 120 to determine the cluster. In some implementations, the feature set includes one or more term features based on communication terms of the communications of the cluster. As one example, and continuing with the previous example, the term features may be based on terms such as "thank you", "qty.", "tax", and/or other terms of the communications of the cluster. In some implementations, the feature set includes one or more structural features based on structural paths of the communications of the cluster. One or more of the term features and/or structural features may optionally be associated with weights indicating the strength of the association of the features to the feature set.

Referring again to FIG. 1, as described above the classification system 140 compares the determined feature set to content of additional documents to determine other documents that are associated with the indication of the classification. For example, the classification system 140 may receive future communications from communications database 150, a client computing device, and/or other component. For each future communication, the classification system 140 may determine structural and/or term features based on content of the communication and compare those features to feature sets stored in features database 152. Classification system 140 may utilize techniques similar to those described with respect to cluster features system 130 in determining structural and/or term features of a communication.

The classification system 140 may determine the features of the communication have at least a threshold level of similarity to one or more of the feature sets and select indications of the classification associated with such feature sets. For example, the classification system 140 may determine the feature set that is most similar to the features of the communication and select an indication of a classification associated with that feature set. In some implementations, the indication of the classification is an identifier of the classification and the identifier may be assigned to the communication (e.g., to automatically label the communication). In some implementations, the indication of the classification is an identifier of a data extraction parser that corresponds to the classification and that data extraction parser may be selected for parsing the communication. For instance, a "flight" data extraction parser may be selected for parsing an email based on determining features of email have a threshold level of similarity to a feature set associated with the "flight" data extraction parser.

In some implementations, the data extraction parser associated with a feature set determined based on a cluster may be a data extraction parser configured based on the cluster. For example, a cluster may be a cluster of structured communications determined by clustering system 120 based on occurrence of classification terms in the communications of the cluster and based on structural paths of the structured communications of the cluster (so that the communications of the cluster have the same or similar structural paths). A data extraction parser may be determined based on the cluster utilizing various techniques. For example, one or more of the structural paths of the communications of the cluster may be classified as "transient," e.g., based one or more determinations that a count of occurrences of one or more segments of text corresponding to those structural paths across the particular cluster satisfy a criterion (e.g., below a frequency threshold="transient"). One or more structural paths of the set of structural paths may also be classified as "fixed," e.g., based one or more determinations that a count of occurrences of one or more segments of text corresponding to those structural paths across the particular cluster fail to satisfy the criterion (e.g., above a frequency threshold="fixed"). The transient structural paths may be utilized to configure a data extraction parser to extract data from future structured communications. For example, the data extraction parser may be configured to extract data from the transient structural paths as those are the paths that "change" in structured communications pertaining to the cluster and that may contain content that would be desirable to extract.

Figure 3:
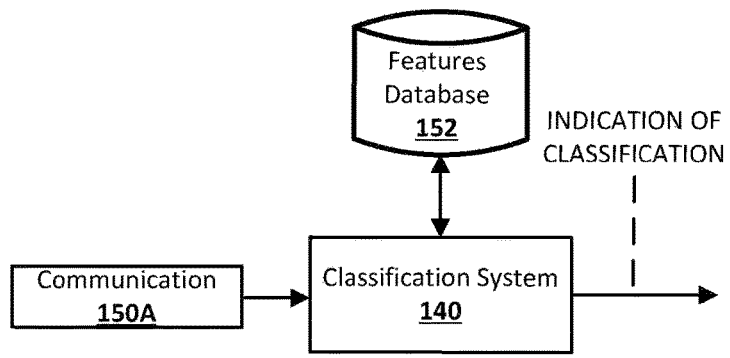
FIG. 3 illustrates an example of how an indication of a classification for a communication may be determined based on comparison of content of the communication to a feature set associated with the indication.

FIG. 3 illustrates an example of how an indication of a classification for a communication may be determined based on comparison of content of the communication to a feature set associated with the indication. Classification system 140 identifies a communication 150A from communications database 150, a client computing device, or another component. Classification system 140 determines structural and/or term features of the communication 150A and compares those features to each of one or more feature sets stored in features database 152—and selects one or more of the feature sets that are most similar to the features of the communication 150A. For example, in some implementations each feature set of features database 152 may be represented as a feature vector. Classification system 140 may determine a communication feature vector that includes structural and/or term features of communication 150A and compare the communication feature vector to each of one or more of the feature vectors of features database 152.

The classification system 140 selects one or more of the feature vectors that are most similar to the communication vector based on the comparison. For example, only the most similar feature vector may be selected, optionally if it satisfies a similarity threshold. For instance, a feature vector associated with an indication of a "purchase" classification may be selected based on it being the most similar to the communication feature vector and it having at least a threshold similarity relative to the communication feature vector. Also, for example, all feature vectors that satisfy a similarity threshold may be selected. For instance, feature vectors associated with indications of "purchase" and "event" classifications may both be selected if they both have at least a threshold similarity relative to the communication feature vector. In some implementations, the comparison may include determining a cross product or a dot product of the two vectors to determine similarity between the two vectors.

The classification system 140 utilizes the indication of the classification that is assigned to the selected classification for one or more purposes. For example, the indication of the classification may be an identifier of the classification and the identifier of the classification may be assigned to the communication 150A. For example, metadata of the communication 150A may be modified to include the indication of the classification and/or an index entry associated with the communication 150A may be modified to include the indication of the classification. The identifier of the classification may be associated with the communication 150A automatically, or optionally after approval of a user that received the communication 150A. As another example, the indication of the classification may be an identifier of a data extraction parser that corresponds to the classification and the classification system 140 may trigger parsing of the communication 150A by the data extraction parser.

Figure 4:
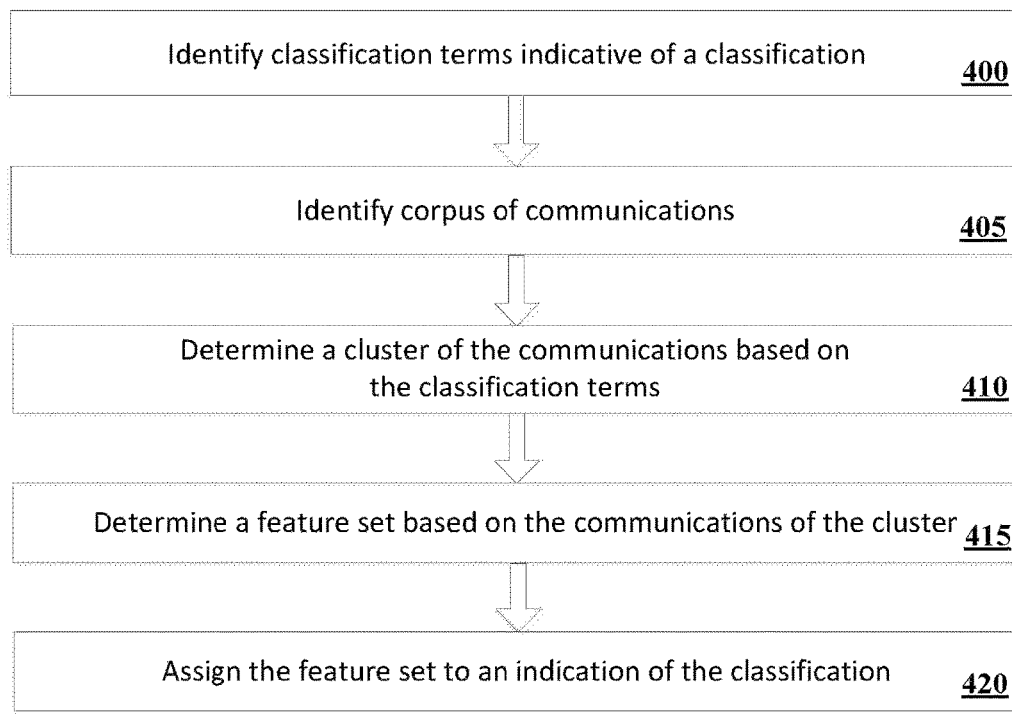
FIG. 4 is a flow chart illustrating an example method of determining a cluster of communications and determining a feature set based on the cluster.

FIG. 4 is a flow chart illustrating an example method of determining a cluster of communications and determining a feature set based on the cluster. For convenience, the operations of the flow chart are described with reference to a system that performs the operations. This system may include various components of various computer systems. For instance, some operations may be performed by one or more components of the clustering system 120 and/or the cluster features system 130, such as classification terms engine 122, structural path engine 124, term features engine 132, and/or structural features engine 134. Moreover, while operations of the method of FIG. 4 are shown in a particular order, this is not meant to be limiting. One or more operations may be reordered, omitted or added.

At step 400, classification terms indicative of a classification are identified. For example, the classification may be "receipts" and the classification terms may include terms such as "purchase", "total", "payment", and "date". The plurality of classification terms indicative of a classification may include user supplied terms and/or terms identified from communications that have been associated with the classification. In some implementations, the system identifies labeled communications from communications database 150 that each have labels indicating the classification—and determines one or more of the classification terms based on the identified labeled communications. In some of those implementations, one or more of the labels may be based on the names of folders with which the labeled communications have been associated and/or one or more of the labels may be based on annotations of the labeled communications by users that received the labeled communications At step 405, a corpus of communications is identified. For example, the system may identify all communications from communications database 150, or a subset of the communications. The identified subset may be, for example, a subset that includes only structured communications or a subset that includes only communications from a certain time period and/or geographic region. Other subsets of communications may be identified as a corpus based on additional or alternative parameters.

At step 410, a cluster of the communications is determined based on the classification terms. For example, the system may determine the cluster based on occurrence of one or more of the classification terms in the communications of the cluster and/or based on structural paths of the structured communications of the cluster. As one example, and continuing with the example of step 400, the system may determine the cluster based on occurrence of a set of one or more of: "purchase", "total", "payment", and "date" in the communications of the duster and/or based on similarity between the structural paths of the communications of the cluster. As described herein, the cluster determined by the system may include one or more communications from communications database 150 that have not been previously labeled with an indication of the classification. As also described herein, the determined cluster may include communications from a plurality of sending entities and/or communications with disparate "subjects".

At step 415, a feature set is determined based on the communications of the cluster. The feature set includes one or more features that are based on content of the communications of the cluster and that are in addition to the classification terms utilized to determine the cluster at step 410. In some implementations, the feature set includes one or more term features based on communication terms of the communications of the cluster. As one example, and continuing with the previous example, the term features may be based on terms such as "thank you", "qty.", "tax", and/or other terms of the communications of the cluster. In some implementations, the feature set includes one or more structural features based on structural paths of the communications of the cluster. One or more of the term features and/or structural features may optionally be associated with weights indicating the strength of the association of the features to the feature set.

At step 420, the feature set is assigned to an indication of the classification. The system may store the feature set and an association to the indication in features database 152 for use by one or more additional components such as classification system 140.

In this specification, the term "database" will be used broadly to refer to any collection of data. The data of the database does not need to be structured in any particular way, or structured at all, and it can be stored on storage devices in one or more locations. Thus, for example, the databases 152 and/or 154 may each include multiple collections of data, each of which may be organized and accessed differently. Also, for example, all or portions of the databases 152 and/or 154 may be combined into one database and/or may contain pointers and/or other links between entries in the database(s). Also, in this specification, the term "entry" will be used broadly to refer to any mapping of a plurality of associated information items. A single entry need not be present in a single storage device and may include pointers or other indications of information items that may be present on other storage devices. For example, an entry that identifies a feature set and an assigned indication of a classification in features database 152 may include multiple nodes mapped to one another, with each node including an identifier of an entity or other information item that may be present in another data structure and/or another storage medium.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 5:
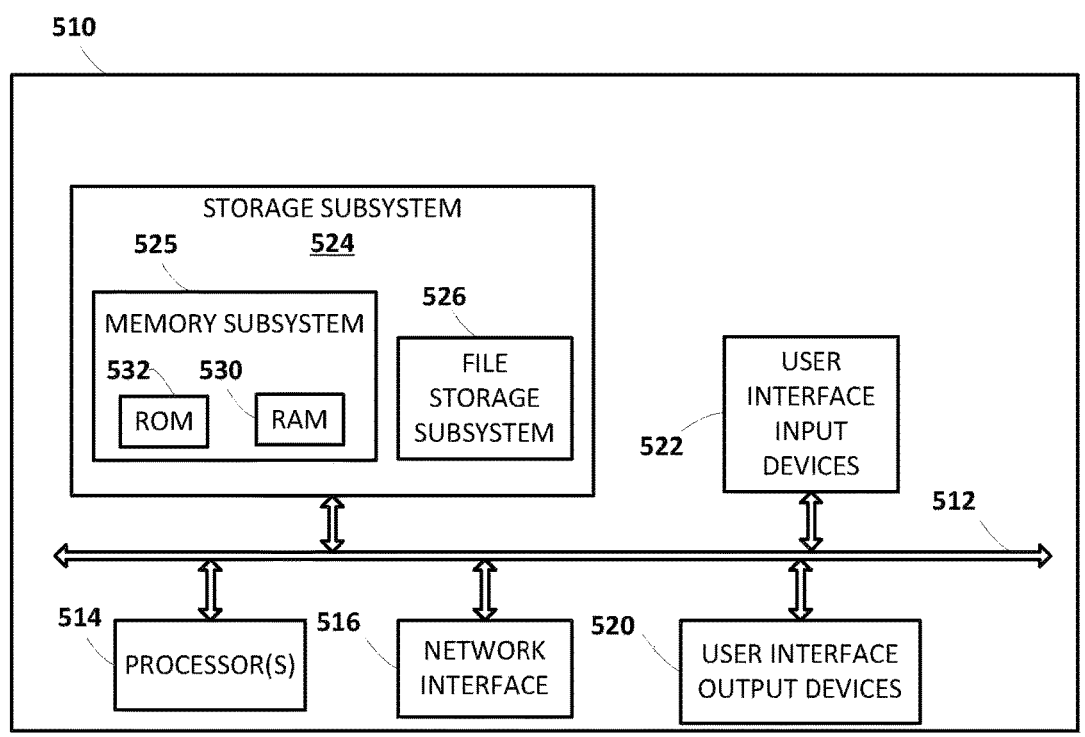
FIG. 5 illustrates an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of the method of FIG. 4, as well as one or more of the operations performed by the clustering system 120, the cluster features system 130, and/or the classification system 140.

These software modules are generally executed by processor 517 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 527, or in other machines accessible by the processor(s) 517.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, tablet, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   identifying a plurality of classification terms indicative of a classification;
   identifying a corpus of communications from one or more databases, the corpus of communications including a plurality of communications that are not labeled with an association to the classification;
   determining a cluster of the communications based on occurrence of one or more of the classification terms in the communications of the cluster;
   subsequent to determining the cluster, determining a feature set based on the communications of the cluster, wherein determining the feature set comprises:
      determining one or more features that are based on content that appears in a plurality of the communications of the cluster,
         wherein the content is in addition to the classification terms used in determining the cluster, and
         wherein determining the features based on the content that is in addition to the classification terms comprises determining the features based on the content appearing in the plurality of the communications of the cluster;
   assigning the feature set to an indication of the classification; and
   using the assigned feature set to classify an additional communication with the classification or using the assigned feature set to select a data extraction parser, for the classification, for the additional communication.

2. The computer implemented method of claim 1, wherein the communications of the cluster include structured communications that are each structured using a given markup language, wherein the given markup language is eXtensible Markup Language or Hypertext Markup Language, and wherein determining the cluster of the communications is further based on similarity of structural paths of the structured communications of the cluster, the structural paths each referencing an address to reach a node, of the given markup language, in a corresponding structured communication.

3. The computer implemented method of claim 2, wherein determining the feature set comprises:
   determining structural features of the features based on the structural paths of the structured communications of the cluster, the structural features indicating at least one of: hierarchical structure of the structural paths, and node types of the nodes of the structural paths.

4. The computer implemented method of claim 3, wherein determining the feature set comprises:
   determining term features of the features based on communication terms of the structured communications of the cluster;
   wherein one or more of the communication terms on which the term features are determined are in addition to the classification terms.

5. The computer implemented method of claim 1, wherein determining the feature set comprises:
   determining term features of the features based on communication terms of the communications of the cluster;
   wherein one or more of the communication terms on which the term features are determined are in addition to the classification terms.

6. The computer implemented method of claim 1, wherein the communications of the cluster include structured communications that are each structured using a given markup language, wherein the given markup language is eXtensible Markup Language or Hypertext Markup Language, and wherein determining the feature set comprises:
   determining term features of the features based on communication terms of the structured communications of the cluster and structural paths of the structured communications of the cluster, wherein the structural paths each reference an address to reach a node, of the given markup language, in a corresponding structured communication, and wherein each of the term features is indicative of a term of the communication terms and one or more of the structural paths in which the term appears in the structured communications of the given cluster.

7. The computer implemented method of claim 1, wherein the communications of the cluster are from a plurality of sending entities.

8. The computer implemented method of claim 1, wherein identifying the classification terms indicative of the classification comprises:
   identifying one or more labeled communications having labels indicating the classification; and
   determining one or more of the classification terms based on the labeled communications.

9. The computer implemented method of claim 8, wherein the labels indicating the classification are based on names of inbox subfolders with which the labeled communications are associated.

10. The computer implemented method of claim 8, wherein the labels indicating the classification are based on annotations of the labeled communications by users that received the labeled communications.

11. The computer implemented method of claim 8, wherein determining the one or more of the classification terms based on the labeled communications comprises:
    selecting a term of the classification terms based on comparison of a frequency of occurrence of the term in the labeled communications to a frequency of occurrence of the term in a larger corpus of documents.

12. The computer implemented method of claim 1, wherein the communications are emails.

13. The computer implemented method of claim 1, further comprising:
    identifying the additional communication; and
    determining the additional communication is associated with the indication of the classification based on comparing the feature set to content of the additional communication.

14. The computer implemented method of claim 13, wherein the indication of the classification is an indication of the data extraction parser for that classification, and further comprising:
    selecting the data extraction parser for parsing the additional communication.

15. The computer implemented method of claim 14, wherein the data extraction parser is configured based on the communications of the given cluster.

16. The computer implemented method of claim 14, further comprising:
classifying structural paths of the communications of the cluster as transient based on text, in the communications of the cluster, corresponding to those structural paths satisfying a criterion; and
configuring the data extraction parser to extract data from the structural paths classified as transient.

17. The computer implemented method of claim 1, wherein the communications of the cluster include structured communications, and wherein determining the cluster of the communications is further based on hierarchical structure of structural paths of the structured communications of the cluster, the structural paths being structural paths of eXtensible Markup Language or Hypertext Markup Language.

18. The computer implemented method of claim 1, wherein the communications of the cluster include structured communications, and wherein determining the feature set comprises:
determining structural features of the features based on hierarchical structure of structural paths of the structured communications of the cluster, the structural paths being structural paths of eXtensible Markup Language or Hypertext Markup Language.

19. The computer implemented method of claim 1, wherein determining the feature set further comprises:
determining a weight, for a given feature of the features, based on a quantity, of the communications of the cluster, in which given content of the content, appears; and
including the weight for the given feature in the feature set.

20. The computer implemented method of claim 1, wherein determining the feature set further comprises:
determining a weight, for given content of the content, based on a quantity, of the communications of the cluster, in which the given content appears; and
based on the weight satisfying a threshold: including a given feature that corresponds to the given content in the feature set, the given feature being one of the features.

21. A system including memory and one or more processors configured to execute instructions stored in the memory, comprising instructions to:
identify a plurality of classification terms indicative of a classification;
identify a corpus of communications from one or more databases, the corpus of communications including a plurality of communications that are not labeled with an association to the classification;
determine a cluster of the communications based on occurrence of one or more of the classification terms in the communications of the cluster;
subsequent to determining the cluster, determine a feature set based on the communications of the cluster, wherein the instructions to determine the feature set comprise instructions to determine one or more features that are based on content that appears in a plurality of the communications of the cluster,
wherein the content is in addition to the classification terms used in determining the cluster, and
wherein the instructions to determine the features based on the content that is in addition to the classification terms include instructions to determine the content based on the content appearing in the plurality of the communications of the cluster;
assign the feature set to an indication of the classification; and
using the assigned feature set to classify an additional communication with the classification or using the assigned feature set to select a data extraction parser, for the classification, for the additional communication.

22. The system of claim 21, wherein the communications of the cluster include structured communications that are each structured using a corresponding markup language, and wherein the instructions to determine the cluster of the communications further include instructions to determine the cluster based on similarity of structural paths of the structured communications of the cluster.

23. The system of claim 22, wherein the instructions to determine the feature set comprise instructions to:
determine structural features of the features based on the structural paths of the structured communications of the cluster, the structural features indicating hierarchical structure of the structural paths.

24. The system of claim 23, wherein the instructions to determine the feature set comprise instructions to:
determine term features of the features based on communication terms of the structured communications of the cluster;
wherein one or more of the communication terms on which the term features are determined are in addition to the classification terms.

25. The system of claim 21, wherein the instructions to determine the feature set comprise instructions to:
determine term features of the features based on communication terms of the communications of the cluster;
wherein one or more of the communication terms on which the term features are determined are in addition to the classification terms.

* * * * *